(12) United States Patent
Apfelbeck

(10) Patent No.: US 6,685,324 B2
(45) Date of Patent: Feb. 3, 2004

(54) EXTERIOR REARVIEW MIRROR

(75) Inventor: Robert Apfelbeck, Plattling (DE)

(73) Assignee: Reitter & Schefenacker GmbH & Co. KG, Esslingen (GB)

( * ) Notice: Subject to any disclaimer, the term of this patent is extended or adjusted under 35 U.S.C. 154(b) by 238 days.

(21) Appl. No.: 09/766,926

(22) Filed: Jan. 22, 2001

(65) Prior Publication Data

US 2001/0009481 A1 Jul. 26, 2001

(30) Foreign Application Priority Data

Jan. 22, 2000 (DE) .......................... 100 02 700

(51) Int. Cl.⁷ ............................................. G02B 7/182
(52) U.S. Cl. ........................................ 359/872; 248/476
(58) Field of Search ............................. 359/871, 872, 359/873, 874, 876, 877; 248/468, 475.1, 476, 477, 478, 491

(56) References Cited

U.S. PATENT DOCUMENTS

| | | | | |
|---|---|---|---|---|
| 3,082,665 A | * | 3/1963 | Jackson | 248/468 |
| 4,171,873 A | * | 10/1979 | Repay et al. | 248/479 |
| 4,488,778 A | * | 12/1984 | Polzer et al. | 248/466 |
| 5,189,561 A | * | 2/1993 | Hong | 359/843 |
| 5,355,255 A | * | 10/1994 | Assinder | 248/481 |
| 5,781,353 A | * | 7/1998 | Seubert et al. | 248/478 |

* cited by examiner

Primary Examiner—Mark A. Robinson
(74) Attorney, Agent, or Firm—Gudrun E. Huckett

(57) ABSTRACT

An exterior rearview mirror for vehicles has a mirror pane support and an adjusting device with a housing for adjusting the position of the mirror pane support. One or more spring elements for connecting the housing and the mirror pane support with one another are provided. The spring elements are part of the mirror pane support and/or the housing. One or more locking counter members interact with the spring elements to connect the housing and the mirror pane support with one another.

33 Claims, 4 Drawing Sheets

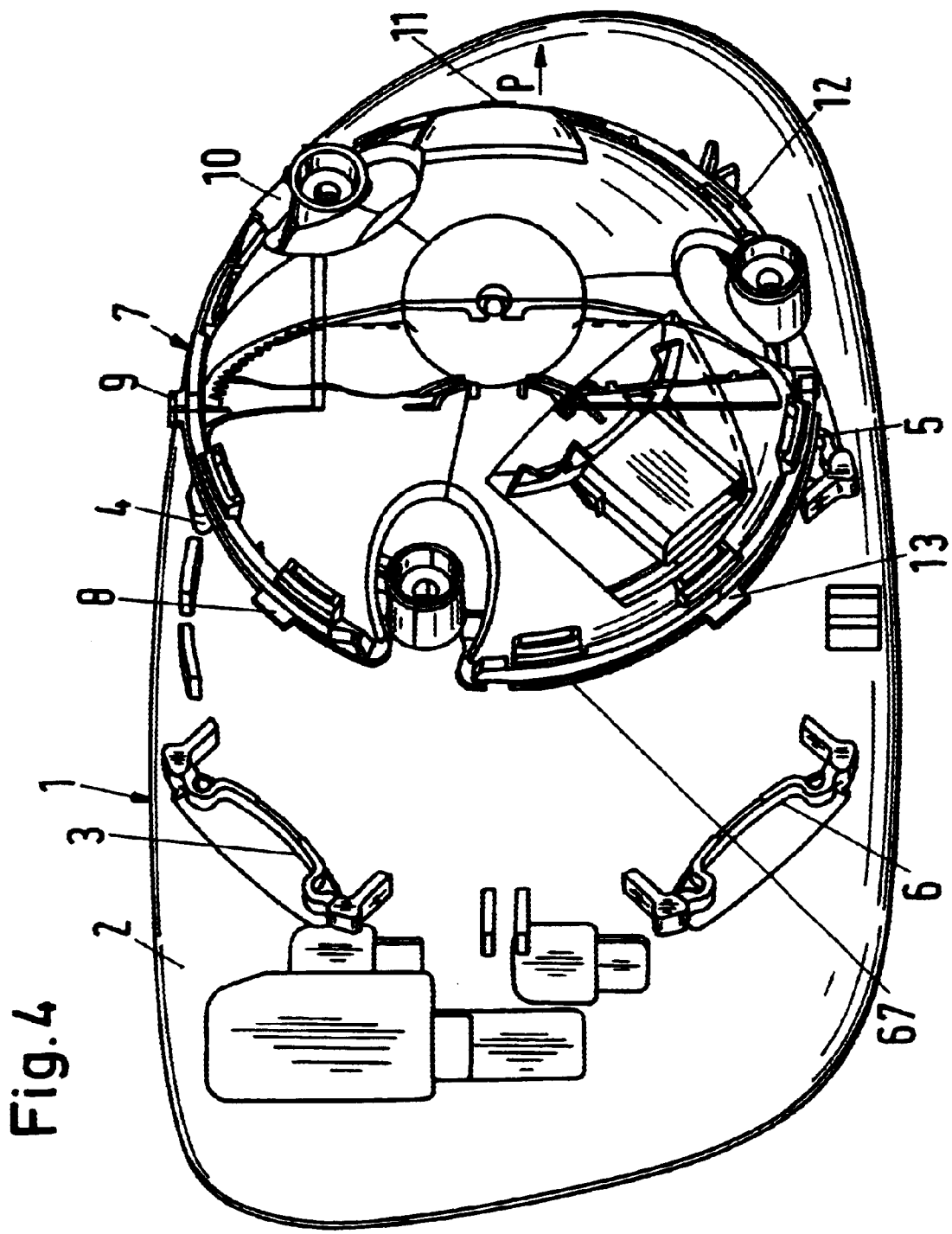

EXTERIOR REARVIEW MIRROR

BACKGROUND OF THE INVENTION

1. Field of the Invention

The invention relates to an exterior rearview mirror for vehicles, in particular, motor vehicles, comprising an adjusting device for adjusting a mirror pane support which adjusting device is arranged in a housing that is secured by means of at least one holding member in the form of a spring element on the mirror pane support.

2. Description of the Related Art

Exterior rearview mirrors are known in which the housing and the mirror pane support are connected by means of a spring or a bayonet closure with one another. The exterior rearview mirror has a complex configuration as a result of the spring or the bayonet closure. Moreover, the process of attaching and mounting these parts is complicated.

SUMMARY OF THE INVENTION

It is an object of the present invention to configure an exterior rearview mirror of the aforementioned kind such that the housing can be connected to the mirror pane support without having to mount additional holding parts.

In accordance with the present invention, this is achieved in that the spring element is part of the mirror pane support and/or of the housing.

As a result of the configuration according to the invention, the spring element must no longer be fastened individually to the housing or to the mirror pane support. This eliminates complex mounting labor so that the exterior rearview mirror can be mounted simply, quickly and inexpensively.

BRIEF DESCRIPTION OF THE DRAWING

In the drawing:

FIG. 4 is an illustration according to FIG. 2, wherein the housing is removed partially from the mirror pane support.

DESCRIPTION OF THE PREFERRED EMBODIMENTS

Figure 1:
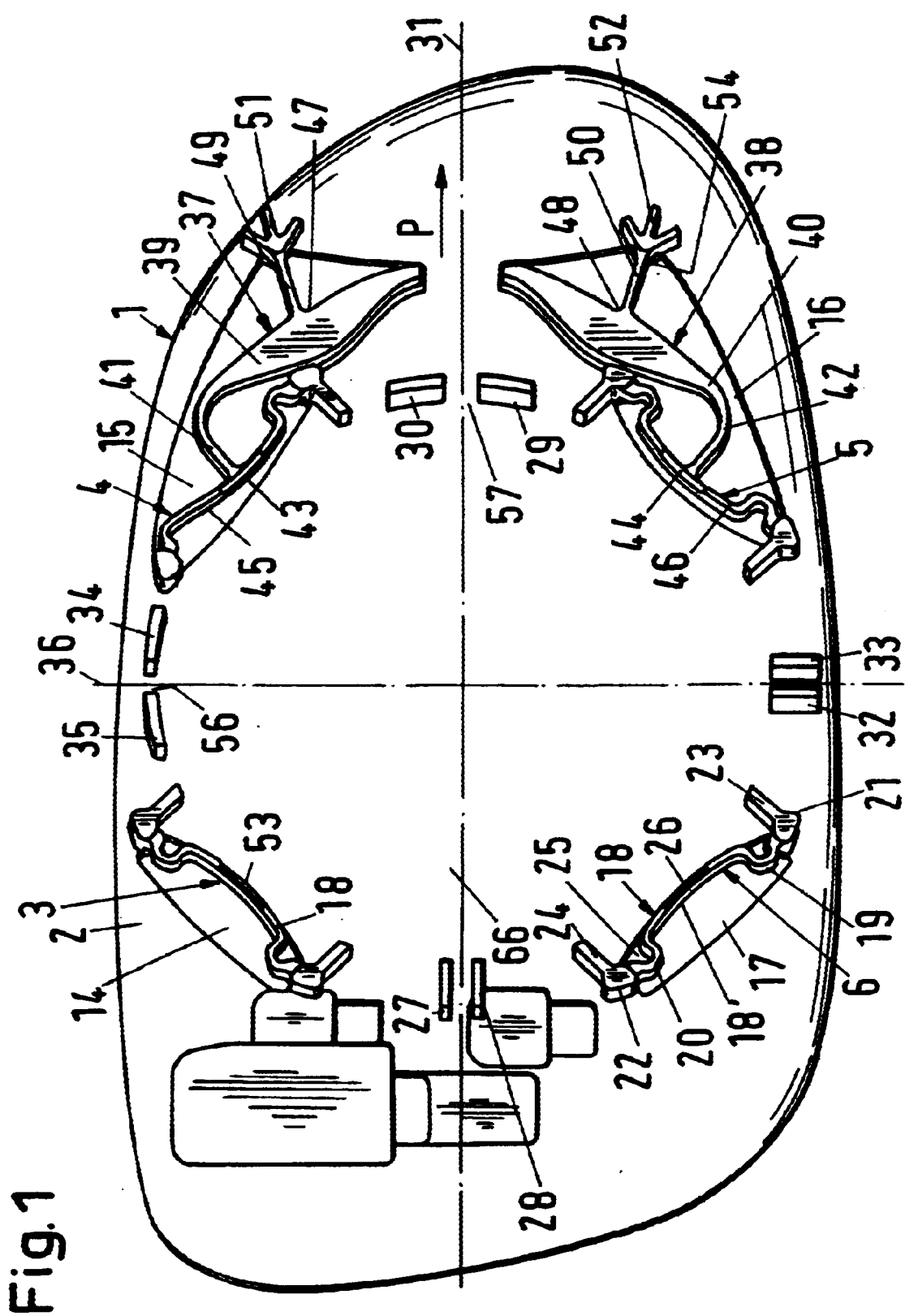
FIG. 1 is a plan view of a mirror pane support of an exterior rearview mirror according to the invention.

The exterior rearview mirror has a mirror base with which it is fastened to the motor vehicle. A mirror head is supported on the mirror base and comprises a mirror housing in which a mirror pane support 1 (FIG. 1 through FIG. 4) is mounted in an adjustable way. It supports on the front side a mirror pane (not illustrated). At the backside 2 of the mirror pane support 1 several spring elements 3 to 6 are provided with which a housing 7 of an adjusting device or drive for the mirror pane support 1 can be secured by a snap connection.

The housing 7, which is approximately of a semi-spherical shape, has a flat underside 67 (FIG. 4) with which it rests on the backside 2 of the mirror pane support 1 when in the mounted position. Locking counter members 8, 10, 12, 13 project radially from the circumferential rim 7' of the housing 7. The counter members 8, 10, 12, 13 are engaged by the spring elements 3 to 6 in the locked position of the housing 7 in that the spring elements 3 to 6 extend across them, respectively. The locking counter members 8, 10, 12, 13 are formed as rectangular, narrow stays which extend in the circumferential direction and whose underside 67 is positioned preferably in a common plane with the underside of the housing 7.

The spring elements 3 to 6 are monolithic parts of the mirror pane support or support plate 1. The mirror pane support or support plate 1 and the spring elements 3 to 6 are manufactured by injection-molding in an injection mold. The spring elements are preferably of identical configuration and are positioned approximately on an imaginary circle with approximately identical circumferential spacing from one another (FIG. 1). The diameter of this circle is somewhat smaller than the width of the mirror pane support 1 in the area of half its length. The mirror pane support 1 is provided with a cutout 14 to 17 in the area of each spring element 3 to 6.

Figure 2:
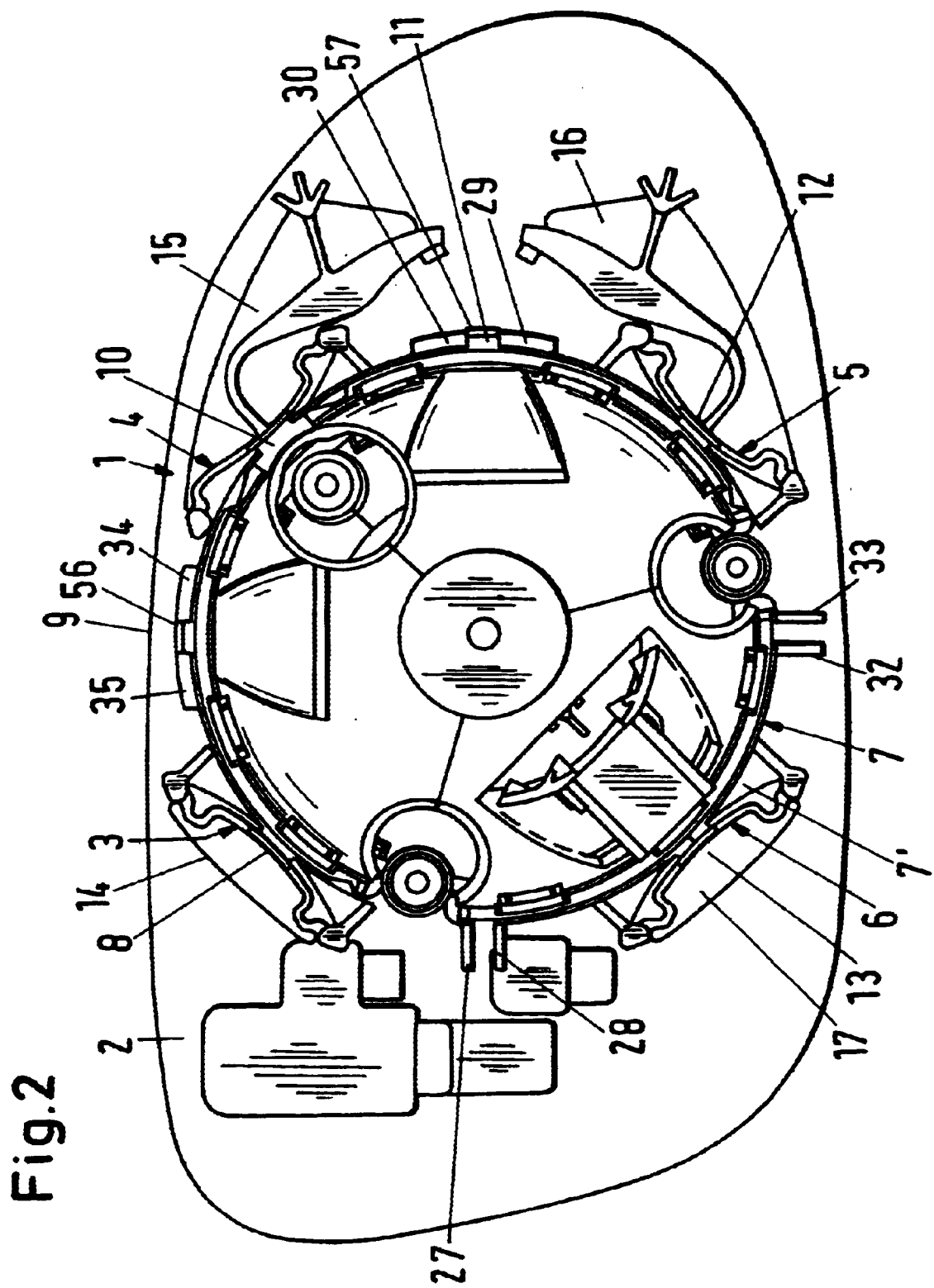
FIG. 2 is a plan view of the mirror pane support of the exterior rearview mirror according to the invention, as illustrated in FIG. 1, with a housing secured thereon.

The configuration of the spring elements 3 to 6 will be explained in more detail in connection with the spring element 6 (FIG. 1). The spring element 6 is positioned above the cutout 17 and is formed as a spring stay positioned on edge. It has a central, substantially U-shaped holding part 18 which extends approximately tangentially to the imaginary circle and has legs 19, 20 which are also approximately U-shaped and bent outwardly in opposite directions away from one another. They adjoin widened portions 21, 22 of holding stays 23, 24 which are provided laterally adjacent to the cutout 17 on the support plate 1. The springy transverse stay 18' of the holding part 18 is curved inwardly with a great radius in the direction toward the axis of the imaginary circle. The transverse stay 18' has approximately at half its width a slanted portion 26 at its upper edge. Between the neighboring spring elements 3 and 6, two short ribs or securing stays 27 and 28 are provided which extend in the longitudinal direction of the support plate 1 or radially relative to the imaginary circle, while at the opposite side, between the spring elements 4 and 5, two ribs or securing stays 29, 30 are positioned which are slightly curved and extend in the circumferential direction of the imaginary circle. The ribs 27, 28 and 29, 30 are positioned symmetrically and with same spacing relative to the longitudinal center plane 31 of the support plate 1. Between the spring elements 6 and 5 and the spring elements 4 and 3, additional securing stays or ribs 32 to 35 are provided. The ribs 32, 33 are positioned symmetrically and directly adjacent to the transverse center plane 36 of the mirror pane support 1 and extend parallel to one another. The oppositely positioned rib pair 34, 35 between the spring elements 3, 4 extends, like the rib pair 29, 30, in the circumferential direction of the imaginary circle and is positioned with same spacing on opposite sides of the transverse central plane 36. The projections 9 and 11 of the housing 7 extend radially into the intermediate spaces or gaps 56, 57 provided by the spacing between the rib pairs 34, 35 and 29, 30 when the housing 7 is in the locked position. The rim 7' of the housing 7 rests against the end faces of the other two rib pairs 27, 28 and 32, 33. The rib pairs 27, 28 and 32, 33 positioned radially relative to the imaginary circle have an angular spacing of 90° relative to one another. The rib pairs 29, 30 and 34, 35 are also positioned at an angular spacing of approximately 90° to one another and are moreover positioned at an angular spacing of 90° to the rib pairs 27, 28 or 32, 33. The rib pairs 27, 28; 32, 33; 29, 30; and 34, 35 are provided for aligning and securing the housing 7 which, as is illustrated in FIG. 2, rests with its circular rim 7' against the end faces of the two radially positioned rib pairs 27, 28 and 32, 33 as well as the longitudinal sides of the rib pairs 29, 30 and 34, 35 extending in the circumferential direction. The rib pairs are positioned centrally between the spring elements 3 to 6, respectively, which have an angular spacing of 90° from one another.

A two-arm pivot lever 37, 38 (FIG. 1) engages the neighboring spring elements 4 and 5, respectively. The pivot or release levers 37, 38 are preferably formed as a monolithic part of the respective spring elements 4, 5 or the mirror pane support 1. The pivot levers 37, 38 have approximately a trapezoidal contour. The end of one lever arm 39, 40 has a curved transition into a connecting stay 41, 42 whose free end adjoins centrally the holding part 45, 46 of the spring element 4, 5. A connecting stay 49, 50 adjoins the lever 37, 38 at the side 47, 48 facing away from the spring element 4, 5 at a location approximately at half the length of the pivot lever 37, 38. The free end of the connecting stay 49, 50 is fork-shaped, i.e., its free end is formed as a three-pronged pawl 51, 52. The pivot lever 37, 38 is secured by the three-pronged pawl 51, 52 in a corner area 53, 54 of the cutout 15, 16 on the mirror pane support 1. The three prongs of each pawl 51, 52 extend perpendicularly to the mirror pane support 1 and are monolithic parts thereof. The pivot lever 37, 38 with its connecting stays 41, 49 and 42, 50 is positioned in the area above the mirror pane support 1 preferably at the level of the spring elements 4, 5. The cutouts 15, 16, in whose areas the spring elements 4, 5 and the pivot levers 37, 38 are positioned, are larger than the cutouts 14, 17 for reasons of manufacture.

In the mounted position of the housing 2 on the mirror pane support 1, illustrated in FIG. 2, the locking counter members 8, 10, 12, 13 are engaged by the holding parts 18, 45, 46 of the spring elements 3 to 6. The projections 9, 11 project into the intermediate spaces or gaps 56, 57 of the rib pairs 29, 30 and 34, 35. The holding parts 18, 45, 46 of the spring elements 3 to 6 are curved slightly in the direction toward the housing 7 so that the housing 7 is secured reliably by the spring elements 3 to 6. Moreover, the holding parts 45, 46 of the spring elements 4, 5 are advantageously pretensioned by the pivot levers 38, 39 in the direction toward the housing 7.

For mounting it, the housing 7 is placed from above into the receiving opening 66 delimited by the spring elements 3 to 6 such that the locking counter members 8, 10, 12, 13 are locked underneath the holding parts 18, 45, 46 of the spring elements 3 to 6. By doing so, the holding elements 18, 45, 46 are elastically deformed. In order to facilitate the elastic deformation of the holding parts 18, 45, 46 when mounting the housing 7, their upper edge is provided with a slanted portion 53, 43, 44, 26, respectively, at the side facing the housing 7. The locking counter members 8, 10, 12, 13 impact these slanted portions and bend the holding parts 18, 45, 46 of the spring elements 3 to 6 out of their initial position elastically outwardly until the holding parts 18, 45, 46 engage across the locking counter members 8, 10, 12, 13 by springing back into their initial position. By means of the projections 9, 11, which engage the intermediate spaces 56, 57 of the rib pairs 34, 35; 29, 30, the housing 7 is secured reliably against rotation.

Figure 3:
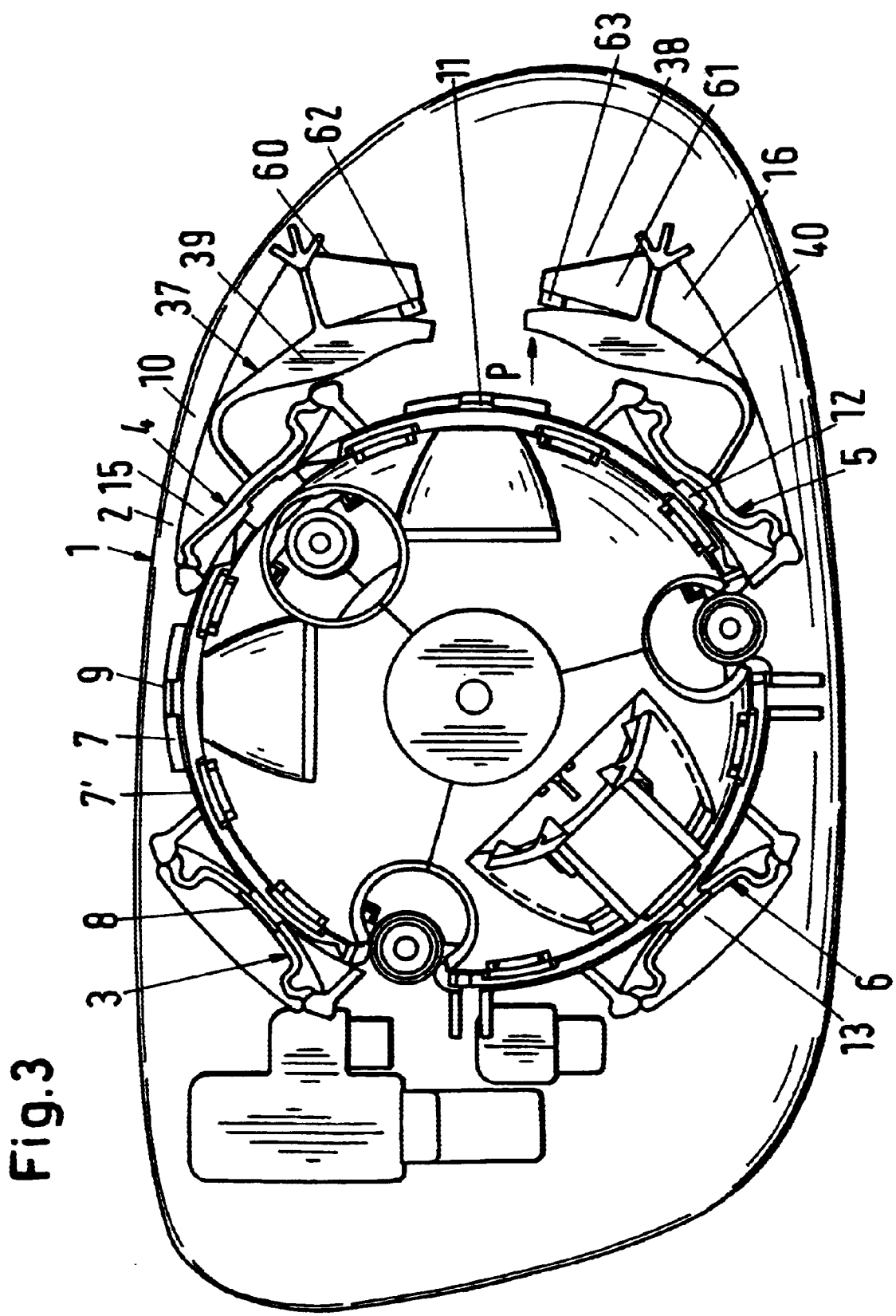
FIG. 3 is an illustration according to FIG. 2, showing the housing in the released position.

For releasing the housing 7 from the mirror pane support 1, the pivot levers (release levers) 37, 38 are pivoted oppositely to one another (FIG. 3). For this purpose, the neighboring lever arms 60, 61, facing away from the corresponding spring element 4, 5, are pivoted into the direction of the housing 7. Since the pivot levers 37, 38 are of a two-arm configuration, the holding parts 45, 46 of the spring elements 4, 5 are elastically bent back via the other lever arms 39, 40 and the connecting stays 41, 42 so that the locking counter members 10, 12 of the housing 7 are released (FIG. 3). Since the connecting stays 41, 42 are of a thin-walled construction, they can be easily elastically bent when pivoting the levers 37, 38. Subsequently, the housing 7, as illustrated in FIG. 4, can be slightly lifted until the projections 9, 11 are released from the rib pairs 34, 35; 29, 30. The housing 7 is then moved in the direction of the arrow P to the right. This makes it possible to disengage the other locking counter members 8 and 13 from the spring elements 3 and 6 so that the housing 7 can be lifted without problems off the mirror pane support 1.

Since the spring elements 3 to 6 and the pivot levers 37, 38 are connected by means of the widened portions 21, 22 and the pawls 51, 52, respectively, to the mirror pane support 1, the spring elements 3 to 6 and the pivot levers (release levers) 37, 38 can be pivoted reliably. Since they are arranged, together with the connecting stays 41, 49; 42, 50, on edge on the mirror pane support 1, they are sufficiently stable despite their elasticity.

In order to maintain the pivot levers 37, 38 in the pivoted release position, noses 62, 63 are provided on the mirror pane support 1. In the release position (FIG. 3), the pivot levers 37, 38, i.e., the lever arms 60, 61 are positioned radially inwardly in front of the noses 62, 63. When it is desired to lock the housing 7 on the mirror pane support 1, the lever arms 60, 61 are lifted across the noses 62, 63 and rested against the other side of the noses 62, 63.

With the described snap or locking arrangement, the housing 7 can be simply released from the mirror support plane 1 without special fastening elements having to be released. Since the spring elements 4, 5 together with the pivot levers 37, 38 are a monolithic part of the mirror pane support 1, a constructively simple embodiment and an inexpensive manufacture are ensured. Moreover, the locking counter members for the housing 7 must not be mounted separately on the housing and then fastened to the mirror pane support 1. Also, the mirror pane support 1 can be installed without further mounting steps immediately after its manufacture by injection molding.

While specific embodiments of the invention have been shown and described in detail to illustrate the inventive principles, it will be understood that the invention may be embodied otherwise without departing from such principles.

What is claimed is:

1. An exterior rearview mirror for vehicles, said rearview mirror comprising:

a mirror pane support;

an adjusting device comprising a housing and configured to adjust a position of said mirror pane support;

one or more spring elements configured to connect said housing and said mirror pane support with one another, wherein said one or more spring elements are part of at least one of said mirror pane support and said housing;

wherein said one or more spring elements comprise a U-shaped holding part wherein said U-shaped holding part has a transverse stay curved toward said housing;

wherein said U-shaped holding part has legs connected to opposite ends of said transverse stay wherein said legs have U-shaped leg ends pointing away from said transverse stay and connected to said mirror pane support.

2. The rearview mirror according to claim 1, wherein said one or more spring elements comprise holding stays connected with a first end to said legs and with a second end to said mirror pane support.

3. The rearview mirror according to claim 2, wherein said first end of said holding stays have a widened portion.

4. The rearview mirror according to claim 1, wherein several of said spring elements are arranged on an imaginary circle.

5. An exterior rearview mirror for vehicles, said rearview mirror comprising:
   a mirror pane support;
   an adjusting device comprising a housing and configured to adjust a position of said mirror pane support;
   one or more spring elements configured to connect said housing and said mirror pane support with one another, wherein said one or more spring elements are part of at least one of said mirror pane support and said housing;
   wherein several of said spring elements are arranged on an imaginary circle;
   further comprising one or more release levers engaging one or more of said spring elements.

6. The rearview mirror according to claim 5, further comprising one or more counter members configured to interact with said one or more spring elements to connect said housing and said mirror pane support with one another.

7. The rearview mirror according to claim 6, wherein said one or more spring elements are a monolithic part of said mirror pane support.

8. The rearview mirror according to claim 7, wherein said one or more counter members are connected to said housing and project radially from said housing.

9. The rearview mirror according to claim 8, wherein said housing has a circular rim and wherein said one or more counter members project radially past said rim.

10. The rearview mirror according to claim 8, wherein two or more of said counter members are successively arranged in a circumferential direction of said housing at a spacing to one another.

11. The rearview mirror according to claim 10, wherein said two or more counter members are narrow stays having a longitudinal extension oriented in said circumferential direction of said housing.

12. The rearview mirror according to claim 5, wherein said one or more spring elements comprise a U-shaped holding part.

13. The rearview mirror according to claim 12, wherein said U-shaped holding pad has a transverse stay curved toward said housing.

14. The rearview mirror according to claim 13, wherein said transverse stay has a slanted portion arranged approximately at half a length of said transverse stay.

15. The rearview mirror according to claim 5, wherein four of said spring elements are arranged on said imaginary circle.

16. The rearview mirror according to claim 5, wherein two of said release levers act on two of said spring elements positioned adjacent to one another.

17. The rearview mirror according to claim 5, wherein said one or more release levers are two-arm levers with two lever arms.

18. The rearview mirror according to claim 17, wherein one of said lever arms of said two arm-lever has a connecting stay engaging one of said spring elements.

19. The rearview mm-or according to claim 5, wherein said release lever and said spring element engaged by said release lever are formed as a monolithic part.

20. The rearview mirror according to claim 5, wherein said release lever comprises a connecting stay having a first end connected to said mirror pane support.

21. The rearview mirror according to claim 20, wherein said connecting stay has a second end adjoining a side of said release lever opposite said spring element at half a length of said release lever.

22. The rearview mirror according to claim 21, wherein said first end of said connecting stay is fork-shaped.

23. The rearview mirror according to claim 5, wherein said mirror pane support has cutouts and wherein at least one of said spring elements and said release levers is located above a cross-sectional plane of said cutouts.

24. The rearview mirror according to claim 5, wherein two of said release levers act on two of said spring elements positioned adjacent to one another, wherein said release levers are two-arm levers each having a lever arm configured to be locked in a pivoted position.

25. The rearview mirror according to claim 24, further comprising two noses configured to cooperate with said lever arms and locking said lever arms in said pivoted position.

26. The rearview mirror according to claim 25, wherein said two noses are connected to said mirror pane support.

27. The rearview mirror according to claim 5, wherein said spring elements and said release levers are positioned upright on said mirror pane support.

28. The rearview mirror according to claim 5, wherein said mirror pane support comprises securing stays arranged between neighboring ones of said spring elements.

29. The rearview mirror according to claim 28, wherein said securing stays are arranged in pairs.

30. The rearview mirror according to claim 29, wherein at least a first one of said pairs is oriented in a direction of a circumferential extension of said spring elements relative to said mirror pane support.

31. The rearview mirror according to claim 30, wherein said securing stays of said first one of said pairs are positioned at a first spacing from one another forming a gap and wherein said housing comprises at least one projection projecting into said gap.

32. The rearview mirror according to claim 31, wherein said securing stays of at least a second one of said pairs are positioned at a second spacing from one another that is smaller than said first spacing.

33. The rear-view mirror according to claim 32, wherein said housing rests against said second one of said pairs.

* * * * *